United States Patent
Tanner

(10) Patent No.: US 8,593,809 B2
(45) Date of Patent: Nov. 26, 2013

(54) ACTIVE COOLING FAN

(71) Applicant: James Tanner, Los Gatos, CA (US)

(72) Inventor: James Tanner, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/758,455

(22) Filed: Feb. 4, 2013

(65) Prior Publication Data

US 2013/0242502 A1 Sep. 19, 2013

Related U.S. Application Data

(63) Continuation of application No. 13/438,350, filed on Apr. 3, 2012, now abandoned.

(60) Provisional application No. 61/611,191, filed on Mar. 15, 2012.

(51) Int. Cl.
*H05K 7/20* (2006.01)
(52) U.S. Cl.
USPC ......... 361/695; 361/690; 165/122; 415/211.2
(58) Field of Classification Search
USPC ................. 361/676–678, 679.46–679.51, 361/688–697, 701–704, 707, 709–710, 754
See application file for complete search history.

(56) References Cited

U.S. PATENT DOCUMENTS

| | | | |
|---|---|---|---|
| 6,652,246 B1 | 11/2003 | Lin et al. | |
| 7,551,442 B2* | 6/2009 | Stefanoski | 361/700 |
| 7,802,617 B2* | 9/2010 | Hwang et al. | 165/122 |
| 2003/0000684 A1* | 1/2003 | Huang et al. | 165/104.33 |
| 2003/0053296 A1* | 3/2003 | Tanaka et al. | 361/719 |
| 2003/0161102 A1* | 8/2003 | Lee et al. | 361/687 |
| 2007/0204976 A1* | 9/2007 | Uchimura et al. | 165/122 |
| 2007/0258206 A1 | 11/2007 | Huang | |
| 2008/0002357 A1 | 1/2008 | Makley et al. | |
| 2009/0016021 A1* | 1/2009 | Kim et al. | 361/697 |
| 2010/0103616 A1* | 4/2010 | Hwang et al. | 361/695 |
| 2011/0157824 A1 | 6/2011 | Fujiwara | |
| 2012/0057301 A1 | 3/2012 | Tan | |

FOREIGN PATENT DOCUMENTS

KR 10-2009-0048908 5/2009

OTHER PUBLICATIONS

International Search Report and Written Opinon for Application No. PCT/US2013/030373 dated Jun. 19, 2013.

* cited by examiner

*Primary Examiner* — Courtney Smith
(74) *Attorney, Agent, or Firm* — Lerner, David, Littenberg, Krumholz & Mentlik, LLP

(57) ABSTRACT

Aspects of the disclosure relate generally to active cooling or removing heat generated by a processor in a computing device. More specifically, heat generated by the processor may be expelled from the computing device using a fan. The fan may include an air intake over an impeller or blades which move air through an impeller portion and an air duct and out of a housing of the fan. The components of the fan may be configured in the housing to increase the area of an air intake which is not obstructed by features such as keyboards or displays in the computing device.

8 Claims, 9 Drawing Sheets

US 8,593,809 B2

ACTIVE COOLING FAN

CROSS-REFERENCE TO RELATED APPLICATIONS

The present application is a continuation of U.S. patent application Ser. No. 13/438,350, filed on Apr. 3, 2012, which claims the benefit of the filing date of U.S. Provisional Patent Application No. 61/611,191 filed Mar. 15, 2012, the disclosures of which are hereby incorporated herein by reference.

BACKGROUND

In a typical computing device, a processor and other components can generate significant amount of heat. It is important to remove some of the heat from the processor in order to protect the processor and other components in the device. In order to expel the heat, it is typically transported through a heat pipe and/or heat pipes into a fin pack. The heat moves through the fins of the fin pack. A blower, or fan, blows air through the fins in order to force the heat from the computing device.

As computing devices have become thinner and more compact, there is less room available for the fan air intake. If the keyboard on a computing device such as a laptop computer encompasses a large portion of the surface area on a device, the fan air intake may be required to be underneath the keyboard. This may cause the fan intake to be smaller, for example having a smaller opening or openings for air. With a smaller intake, the impeller or blades of the fan must move faster in order to provide a sufficient volume of air through the fin pack for cooling. The increased speed may cause more noise and require a greater draw on the device's power source. This may be an annoyance to users of these devices, and may also degrade the device's performance.

SUMMARY

One aspect of the disclosure provides a fan for expelling heat from a computing device. The fan includes a housing having an air duct which terminates in an opening for allowing air leave the housing. The housing also includes a pair of edges on opposite sides of the opening. The fan also includes an impeller housed in the first part. The impeller including one or more blades for moving air through the housing. The impeller and the opening are arranged such that an imaginary plane through the edges passes through at least a part of the impeller.

In one example, the impeller further includes a center portion and the imaginary plane passes through the center portion. In another example, the housing is arranged such that air flow moves through the housing in a partial loop pattern. In yet another example, the housing has a generally rounded shape.

Another aspect of the disclosure provides a computing device. The computing device includes a housing having a top surface and a side surface adjacent to the top surface. The computing device also includes a processor configured to execute instructions. Heat is generated during execution of the instructions. The computing device includes a fin pack for receiving the heat generated by the processor. The fin pack is disposed in the housing adjacent to the sidewall. The computing device also includes a fan. The fan has a fan housing having a first part and a second part. The second part of the fan housing comprising an air duct which terminates in an opening for allowing air leave the fan housing. The second part of the fan housing also includes a pair of edges on opposite sides of the opening. The opening of the fan housing is positioned adjacent to the fin pack and the first part of the fan housing being adjacent to the sidewall. The fan also includes an impeller housed in the first part of the fan housing. The impeller includes one or more blades for moving air through the housing and a center portion. The fan housing and the impeller are arranged such that an imaginary plane through the center portion of the impeller and orthogonal to the sidewall does not pass through the fin pack.

In one example, the impeller and the opening are arranged such that a second imaginary plane through the edges passes through at least a part of the impeller. In another example, the impeller is positioned in the fan housing such that the second imaginary plane passes through the center portion. In yet another example, the first part and the second part of the housing are arranged such that air flow moves through the housing in a partial loop pattern. In a further example, the fan housing has a generally rounded shape.

DETAILED DESCRIPTION

Figure 1A:
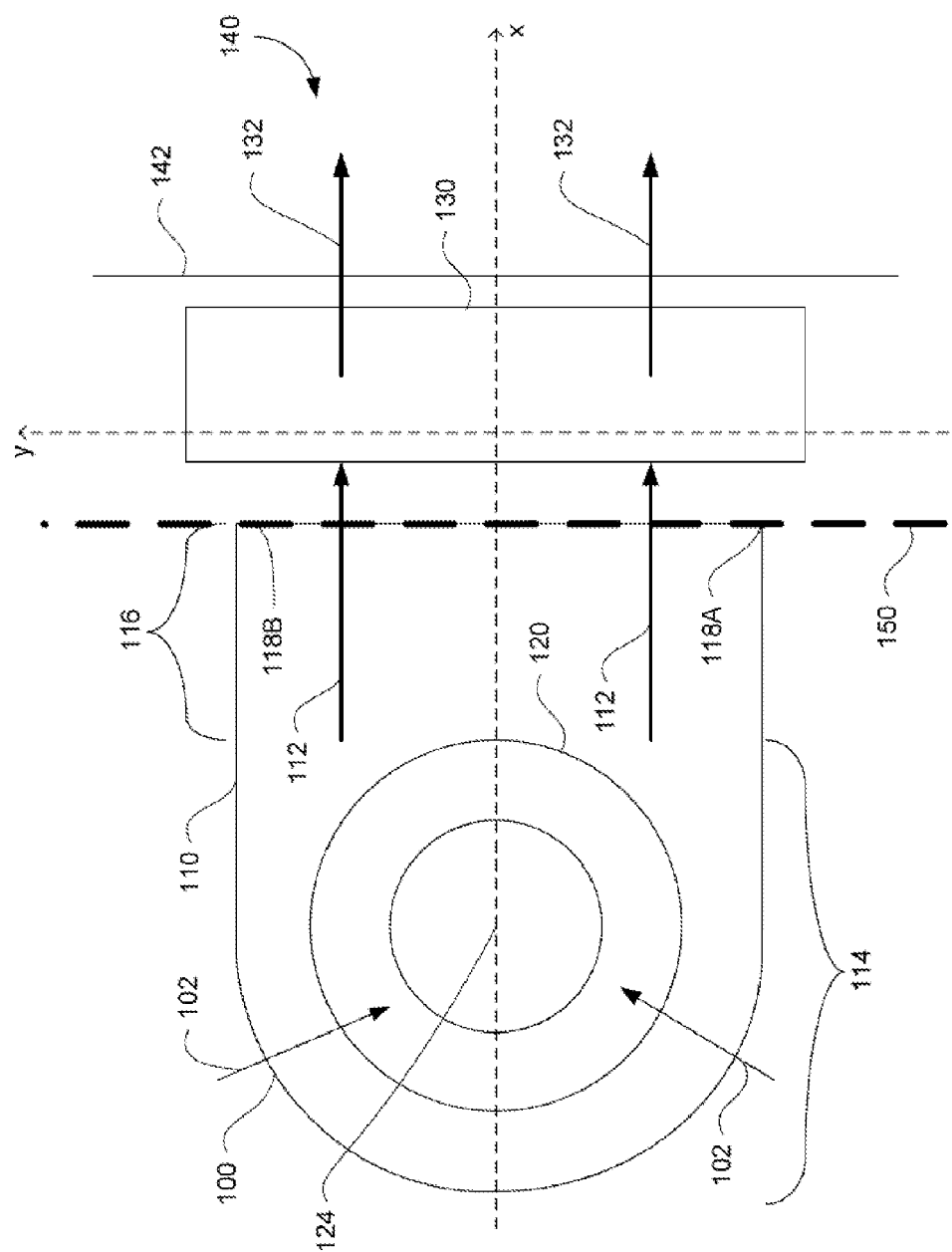
FIG. 1A is a diagram of a fan of the prior art.
Figure 1B:
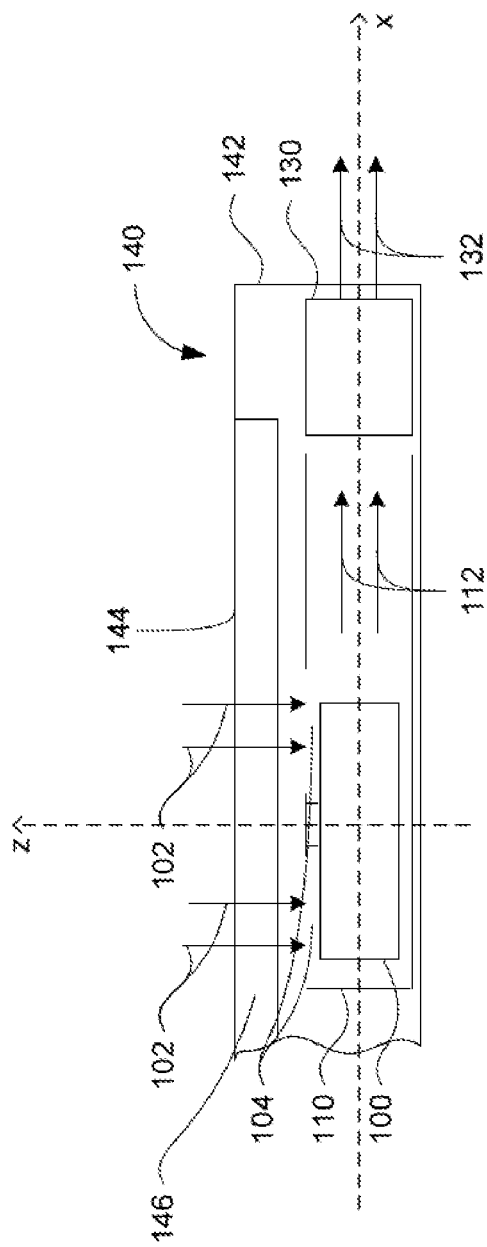
FIG. 1B is a partial cross sectional view of a fan and a computing device in the prior art.

Aspects of the disclosure relate generally to active cooling or removing heat generated by a processor in a computing device. In a typical mobile computing device (such as a laptop computer), heat is transported through a heat pipe and/or heat pipes into a fin pack. A blower forces air over the fins of the fin pack in order to expel the heat from the device. FIG. 1A is a partial top down view of a computing device 140 and a typical arrangement of a fan 100, fin pack 130 and sidewall 142 of the computing device. FIG. 1B is a partial cross sectional side view of computing device 140.

Fan 100 is an example of a typical prior art fan having a housing 110. An impeller portion 114 of the housing houses the impeller 120 or blades of the fan. Above the impeller is a fan air intake 104 (shown in FIG. 1B) A second part of the housing includes an air duct 116 which ends in an opening between the edges 118A and 118B of the housing. Imaginary line 150 representing an imaginary plane into the page of FIG. 1A (shown in FIG. 1A) through the edges 118A and 118B of the opening 118 does not cross through the impeller 120 or the impeller portion 114 of the housing 110. As shown in FIGS. 1A and 1B the air duct 116 is situated between the impeller 120 and the fin pack 130. For example, an imaginary plane into the page of FIG. 1A and passing through the x-axis line through the center 124 of the impeller 120, which is also orthogonal to the sidewall 142 of the computing device, crosses through the fin pack 130.

As described above, heat from a processor is transferred to the fin pack via a heat pipe and/or heat pipes. The air intake (not shown) allows air to flow through the housing 110 of the fan 100. For example, air flows in the negative z-direction (indicated by directional line z) into blades of the impeller 120, and into the air duct 116 in the positive x-direction (indicated by directional line x). Thus, air flow 102 is generally into page of FIG. 1A and moves in the negative z-direction into the fan in FIG. 1B. Once through the impeller, air flow, depicted by arrows 112, moves through the air duct 116 towards the fin pack 130. Air flow 112 moves in the positive x-direction of FIG. 1A and FIG. 1B. The air flow then moves from the air duct 116 and through the fin pack 130 collecting heat from the fin pack. The heated air flow, depicted by arrows 132, is then sent through the sidewall 142 via one or more exhaust openings (not shown) and out of the computing device.

As shown in the FIG. 1B a keyboard 146 may reduce the area of the fan air intake 104 exposed to the top surface 144 of the computing device 140. In addition, if the profile of the computing device is very thin, on the order of a centimeter or less, the space for components within the computing device is limited. For example, if a keyboard takes up half of the space for components, there is very little room for the fan. The blades of the fans impeller must be very thin, for example on the order of 2.5 millimeters. At this width, the blades become very inefficient at drawing air into the fan. This may be exacerbated by the obstruction of the keyboard. Thus, in order to maintain a certain volume of air moving through the intake and into the fan 100, the speed of the impeller must be increased (as compared to a fan 100 without an obstruction such as keyboard 146 between the fan 100 and the air source).

Figure 2:
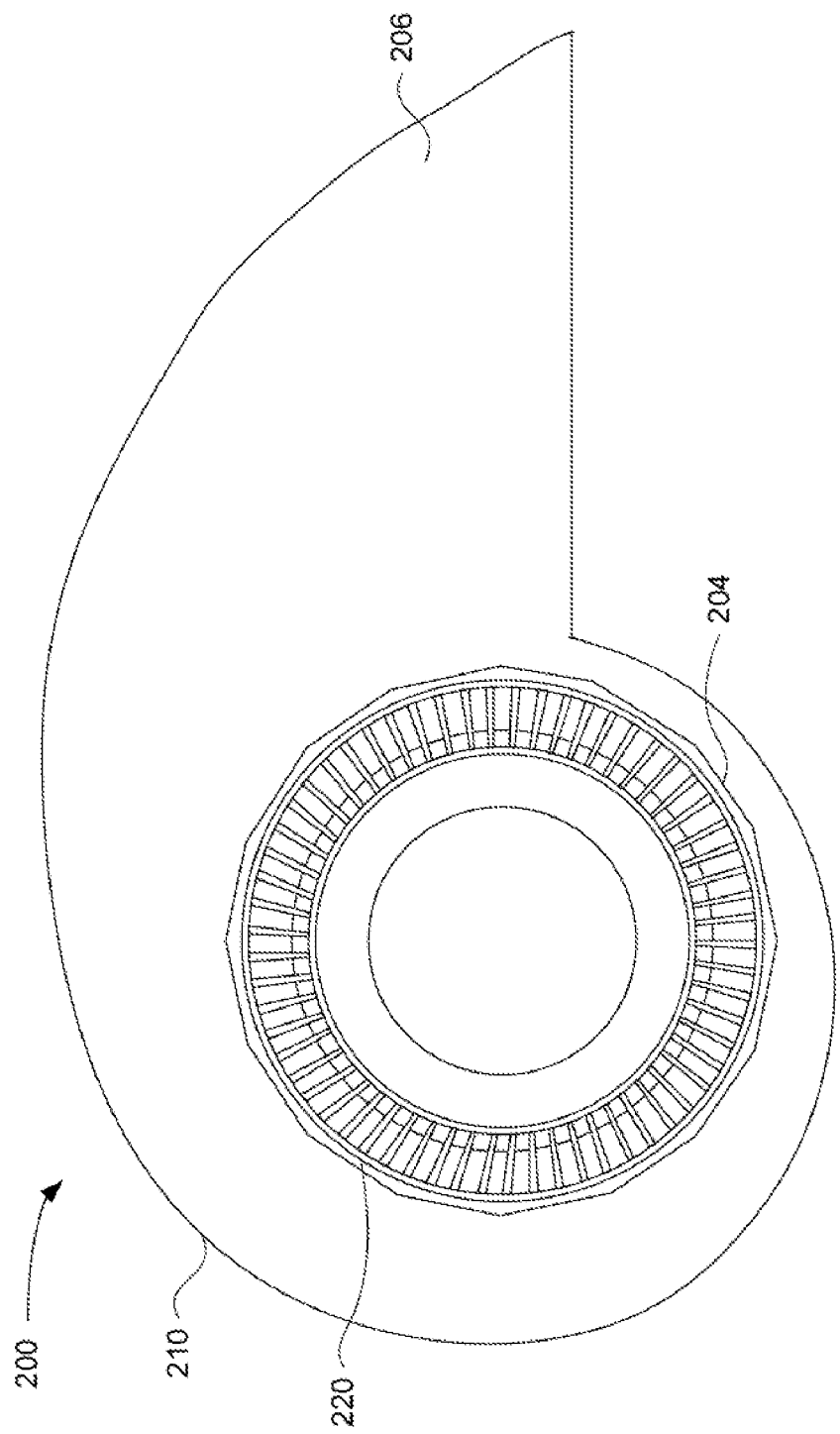
FIG. 2 is a diagram of a fan in accordance with an example implementation of the disclosure.

As compared to fan 100, a fan 200 illustrated in FIG. 2, may be configured to reduce the area of the fan air intake obstructed by features such as keyboards or displays in a computing device. In this example, fan 200 includes a housing 210 having a fan air intake 204 in the top portion 206 of the housing above the impeller 220. Rather than being completely open as shown in FIG. 2, the fan air intake may include a cap with a plurality of openings for allowing air to flow into the impeller 220. The openings may be any configuration which allows a sufficient volume of air to flow through in order to provide cooling for a computing device.

Figure 3:
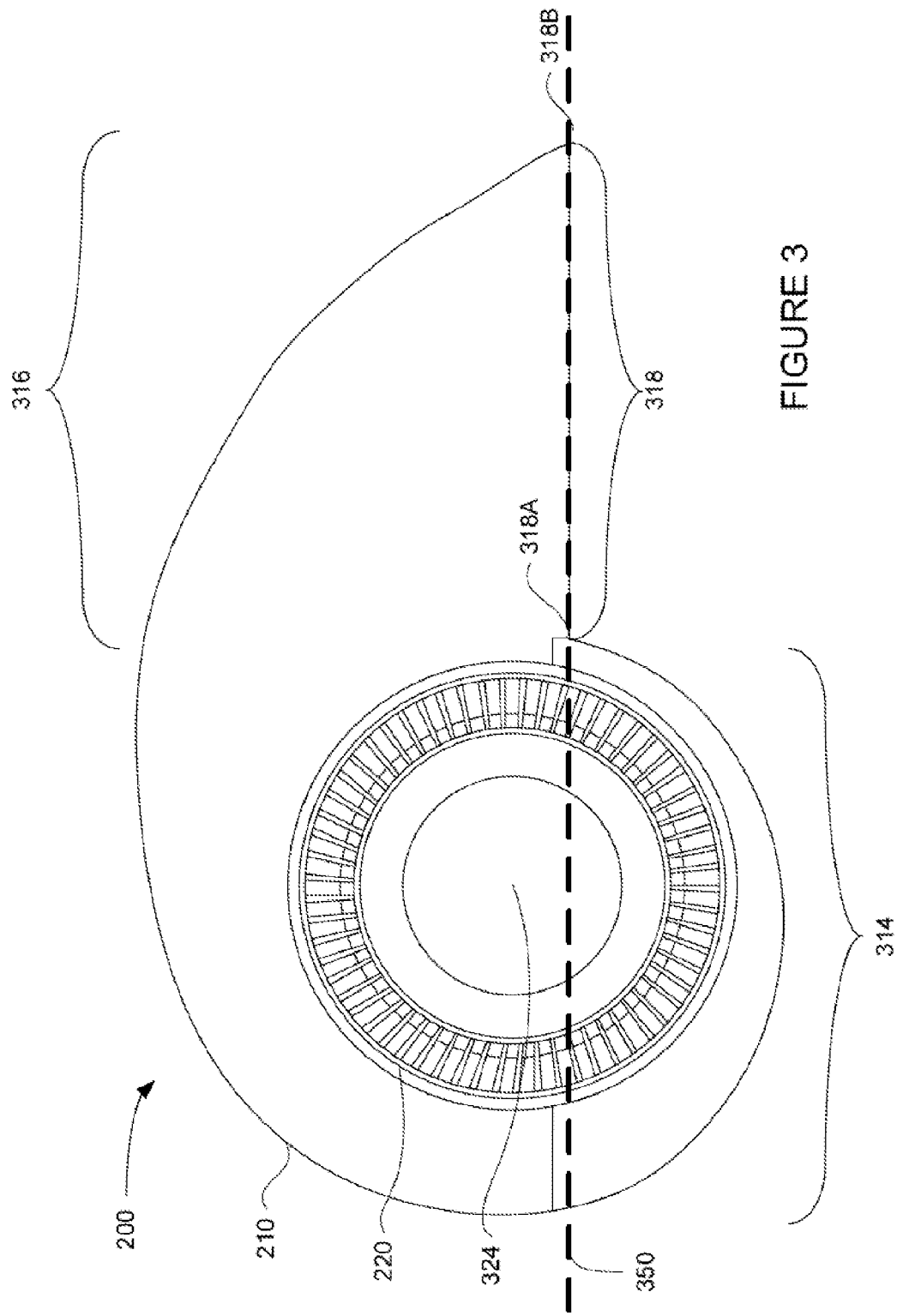
FIG. 3 is another diagram of the fan of FIG. 2.

The interior of the fan's housing may include an impeller portion and an air duct for allowing air to flow through the fan. For example, FIG. 3 is a top down view of fan 200 with the top portion 206 removed. The housing 210 includes an impeller portion 314 housing an impeller 220 and an air duct 316. The air duct 316 ends in an opening 318 between edges 318A and 318B of the housing. This arrangement allows air to flow from the intake through the impeller portion 314 and the air duct 316 and out of the opening 318. The housing 210 of fan 200 includes a generally rounded shape giving the air flow pattern through the housing is a partial loop shape or coil.

Figure 8:
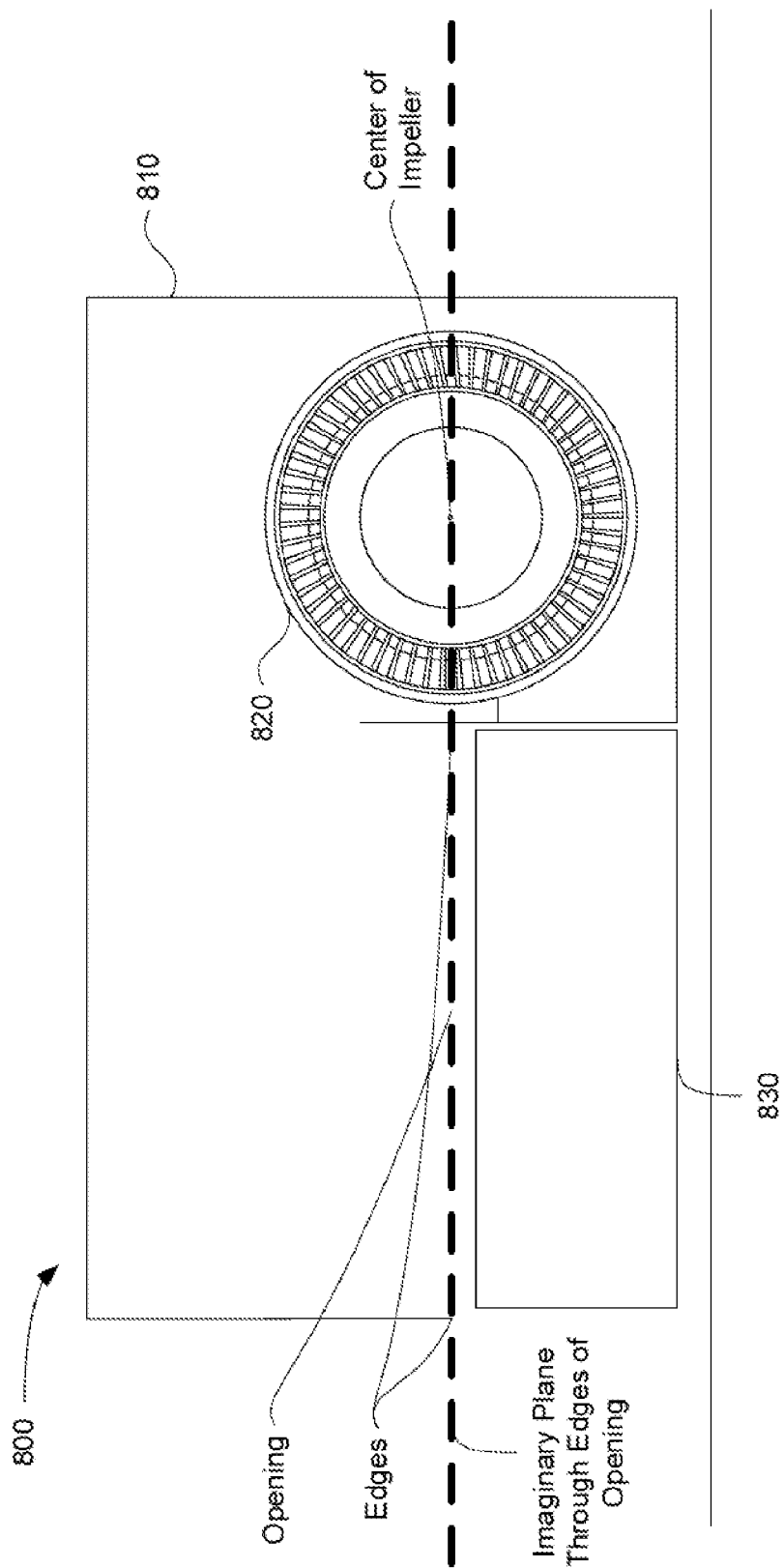
FIG. 8 is another partial cross sectional view of a computing device in accordance with an example implementation of the disclosure.

The edges of the opening 318 may be inline with at least a portion of the impeller 220. For example, an imaginary plane extending into the page of FIG. 3, represented by imaginary line 350, through the edges 318A and 318B of the opening 318 crosses through the impeller 220 and the impeller portion 314 of the housing 210. In this example, the imaginary plane represented by imaginary line 350 is offset from a center 324 of the impeller though in other configurations, the imaginary line through the edges of the opening may cross through the impeller 220 above or below the center 324 of the impeller or through the center of the impeller (see FIG. 8).

Figure 4:
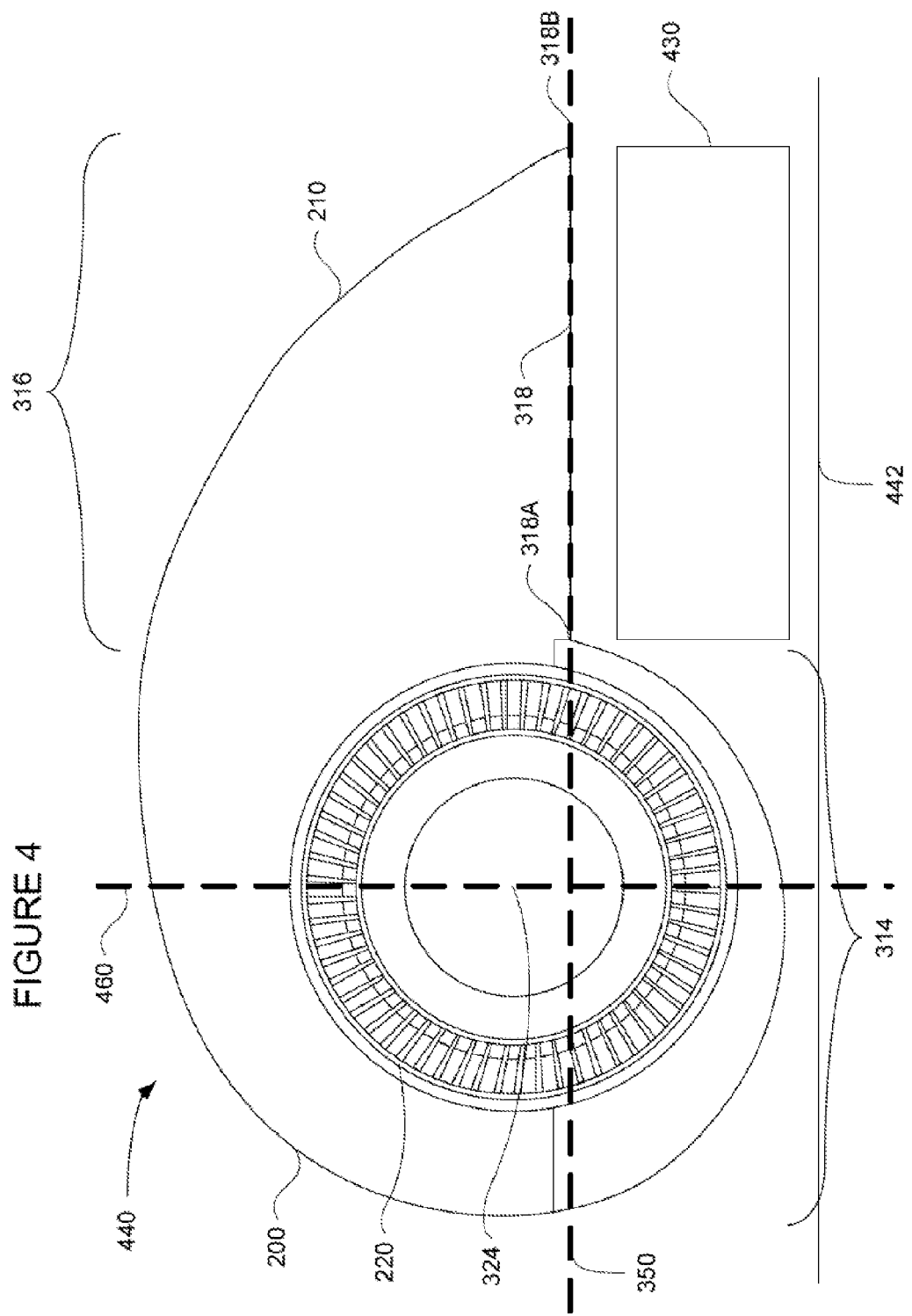
FIG. 4 is a partial cross sectional view of a computing device in accordance with an example implementation of the disclosure.

The fan may be disposed in a computing device proximate to a sidewall of the computing device. For example, FIG. 4 is partial top down view of an example computing device 440 including a fan 200, fin pack 430 and sidewall 442 of the computing device. In this example, the air duct 316 is situated adjacent to, and not between, each of the impeller 220 and the fin pack 430. Comparing to FIG. 1A, impeller 220 is positioned closer to sidewall 442 than impeller 120 is to sidewall 142. In this arrangement, the fin pack is not directly between the sidewall of the computing device and the impeller. For example, a plane represented by imaginary line 460 from the center 324 of the impeller which is orthogonal to the sidewall 242 of the computing device does not cross through the fin pack 430. For example, FIG. 5 is a partial cross sectional side view of the arrangement depicted in FIG. 4.

The computing device may include a processor, memory, instructions, and other components typically present in general purpose computers. For example, as shown in FIG. 6, computing device 440 may include a plurality of features such as a processor 610, a heat pipe 620, the fan 200, and the fin pack 430. Processor 610 may actually include one or more processors depending upon the arrangement of the features of computing device 440. It will be understood that the arrangements depicted in FIGS. 4, 5, and 6 are merely an illustrative example and not a required arrangement, orientation, sizing, etc. of the features of computing device 400. The computing device 440 may include various mobile computing devices such as a mobile phone, tablet PC, electronic book reader, netbook, laptop computer, or other such devices with a relatively thin profile, for example a few centimeters or less.

Figure 5:
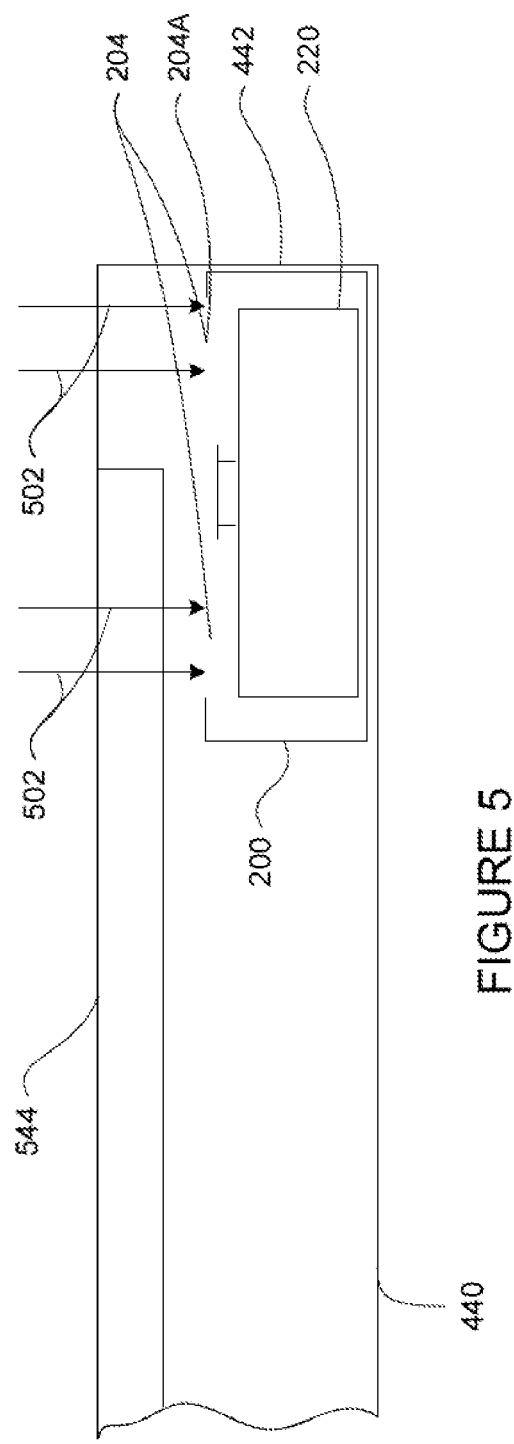
FIG. 5 is a partial cross sectional view of a computing device in accordance with an example implementation of the disclosure.
Figure 6:
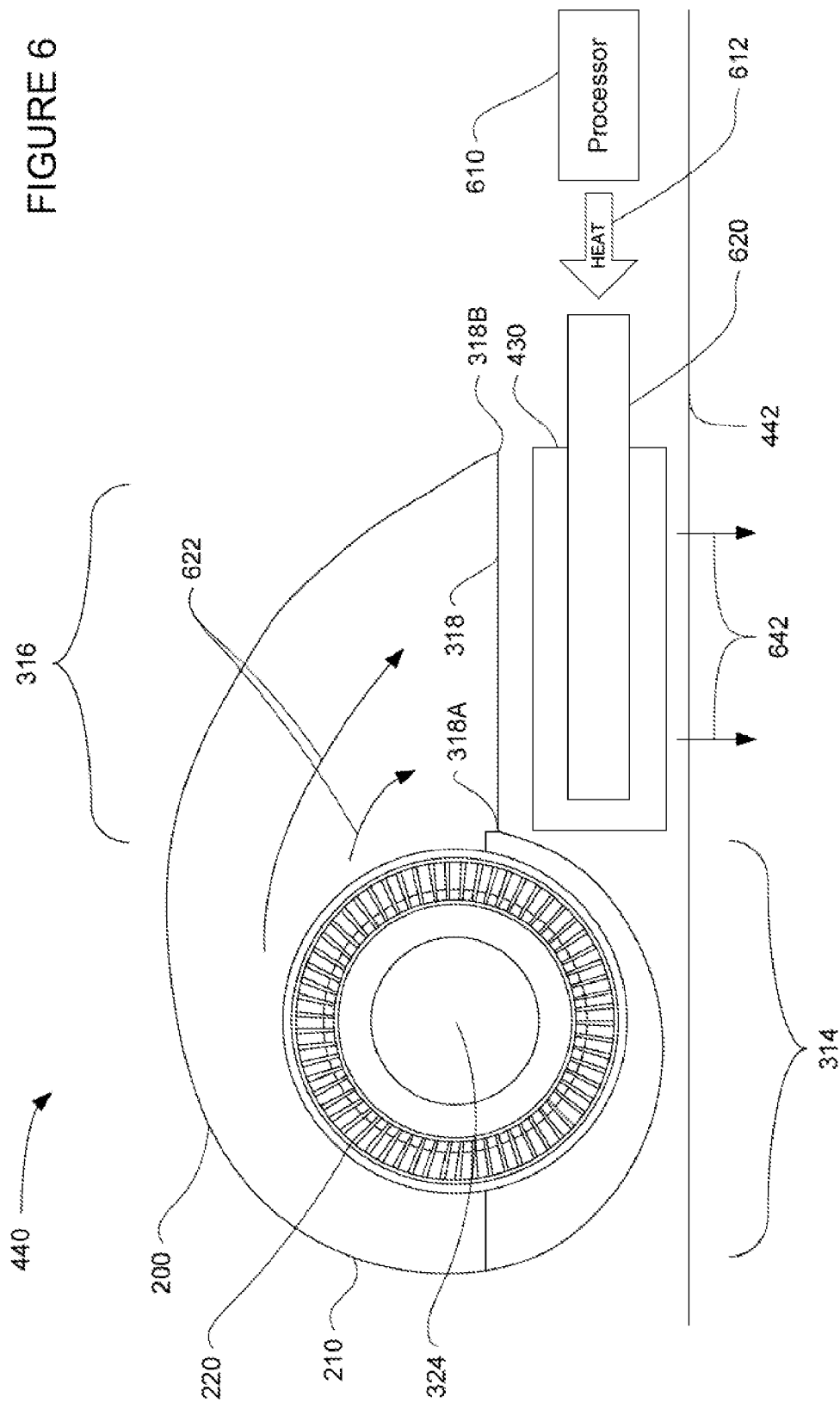
FIG. 6 is another partial cross sectional view of a computing device in accordance with an example implementation of the disclosure.

As shown in FIG. 5, computer feature 544, such as a keyboard (for example, in the case of a laptop or mobile phone with a small keyboard) or a display (for example, in the case of a mobile phone, tablet PC, electronic book reader, netbook, laptop computer), only covers a portion of intake 204. Because the impeller is close to the sidewall 442, the portion 204A of the intake 204 is not obstructed by the feature 544. This allows the impeller 220 to pull a greater volume of air into the fan with less effort than impeller 120 of the prior art fan 100.

As noted above, the computing device may include a processor which generates heat some of which may be expelled from the computing device by the fan. As shown in FIG. 6, this heat generated by the processor 610 moves (as shown by heat arrow 612) to a heatpipe 620. The heatpipe 620 is located adjacent to and contacts the fin pack 430. The impeller 220 of fan 200 pulls air through the fan air intake 204 in the direction of arrows 502 (see FIG. 5). The air is moved by the impeller 220 and through the impeller portion 314 and air duct portions 316 in the general direction of air flow arrows 622 towards the fin pack 430. The air continues through the fin pack 430 collecting heat. The heated air then moves out of the computing device 440 as shown by arrows 642.

Returning to FIG. 5, computer feature 544, such as a keyboard (for example, in the case of a laptop computer or mobile phone with a small keyboard) or a display (for example, in the case of a mobile phone, tablet PC, electronic book reader, netbook, laptop computer), only covers a portion of the fan air intake 204. Because the impeller is close to the sidewall 442, the portion 204A of the fan air intake 204 is not obstructed by the feature 544.

Figure 7:
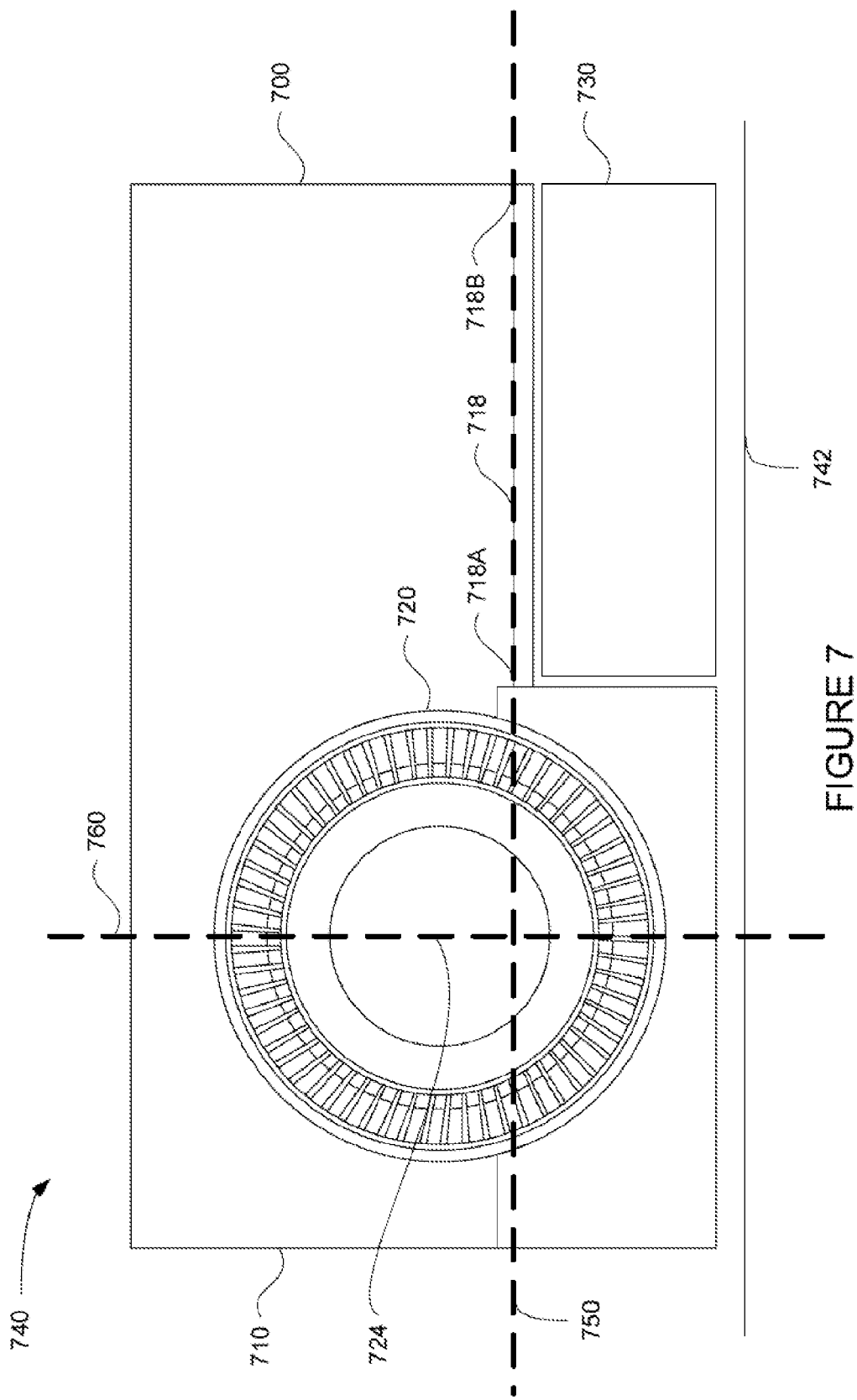
FIG. 7 is a further partial cross sectional view of a computing device in accordance with an example implementation of the disclosure.

Other housing configurations may also capture the benefits of fan 200 above. For example, fan 700 of FIG. 7 includes an impeller 720 arranged in a generally rectangular housing 710. Similar to housing 210, housing 710 of fan 700 gives the air flow pattern through the housing is a partial loop shape. In addition, the edges 718A and 718B of opening 718 are also inline with at least part of the impeller 720 as shown by imaginary line 750 representing a plane into the page of FIG. 7. FIG. 7 also depicts a partial view of a computing device 740 having a fin pack 730 and a sidewall 742. An imaginary line 760 representing imaginary plane through the center 724 of the impeller 720 and orthogonal to the sidewall 742 does not cross through the fin pack 730. In another example, fan 800 has a housing 810 which is similar to 710 in that it has a generally rectangular shape with partial loop airflow. However, the impeller 820 and the fin pack 830 are in a different orientation than the impeller 720 and fin pack 730 of FIG. 7. In this example, as noted above, an imaginary plane through the edges of the opening is in line with a center of the impeller 820.

The fans described in the present disclosure may be advantageous in allowing computing devices to be thinner and lighter without sacrificing processing speed or efficiency of the fan. As the fan is close to the sidewall, the air intake may also be close to the sidewall. This arrangement allows for the intake to be positioned away from a keyboard or display thereby increasing the area of an air intake which is not obstructed by features such as keyboards or displays in a computing device.

As these and other variations and combinations of the features discussed above can be utilized without departing from the subject matter defined by the claims, the foregoing description of the embodiments should be taken by way of illustration rather than by way of limitation of the subject matter defined by the claims. It will also be understood that the provision of the examples disclosed herein (as well as clauses phrased as "such as," "including" and the like) should not be interpreted as limiting the claimed subject matter to the specific examples; rather, the examples are intended to illustrate only one of many possible embodiments. Further, the same reference numbers in different drawings may identify the same or similar elements.

The invention claimed is:

1. A fan for expelling heat from a computing device, the fan comprising:
    a housing having an air duct which terminates in an opening for allowing air to leave the housing, the housing further having a pair of edges on opposite sides of the opening; and
    an impeller housed in the housing, the impeller including one or more blades for moving air through the housing;
    wherein both edges of the pair of edges are positioned on one side of the impeller, and wherein the impeller and the opening are arranged such that an imaginary plane through the edges passes through at least a part of the impeller.

2. The fan of claim 1, wherein the impeller further includes a center portion and the imaginary plane passes through the center portion.

3. The fan of claim 1, wherein the housing is arranged such that air flow moves through the housing in a partial loop pattern.

4. The fan of claim 1, wherein the housing has a generally rounded shape.

5. A computing device comprising:
    a housing having a top surface and a sidewall adjacent to the top surface;
    a processor configured to execute instructions, whereby heat is generated during execution of the instructions;
    a fin pack for receiving the heat generated by the processor, the fin pack being disposed in the housing adjacent to the sidewall; and
    a fan, the fan including:
    a fan housing having a first part and a second part, the second part of the fan housing comprising an air duct which terminates in an opening for allowing air leave the fan housing, the second part of the fan housing also including a pair of edges on opposite sides of the opening, the opening of the fan housing being positioned adjacent to the fin pack and the first part of the fan housing being adjacent to the sidewall; and
    an impeller housed in the first part of the fan housing, the impeller including one or more blades for moving air through the fan housing and a center portion;
    herein the fan housing and the impeller are arranged such that an imaginary plane through the center portion of the impeller and orthogonal to the sidewall does not pass through the fin pack, and wherein the impeller and the opening are further arranged such that a second imaginary plane through the edges passes through at least a part of the impeller.

6. The computing device of claim 5, wherein the impeller is positioned in the fan housing such that the second imaginary plane passes through the center portion.

7. The computing device of claim 5, wherein the first part and the second part of the fan housing are arranged such that air flow moves through the fan housing in a partial loop pattern.

8. The computing device of claim 5, wherein the fan housing has a generally rounded shape.

* * * * *